April 4, 1950 — A. W. NIKANDER — 2,502,879
ARTIFICIAL BAIT
Filed June 9, 1947
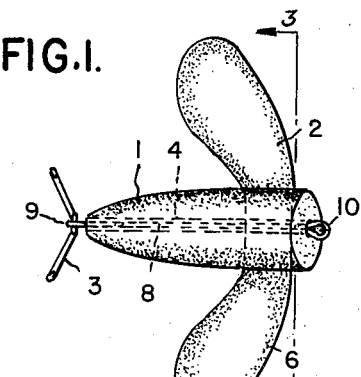
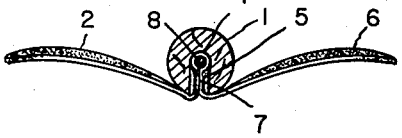
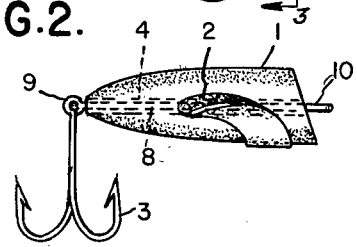
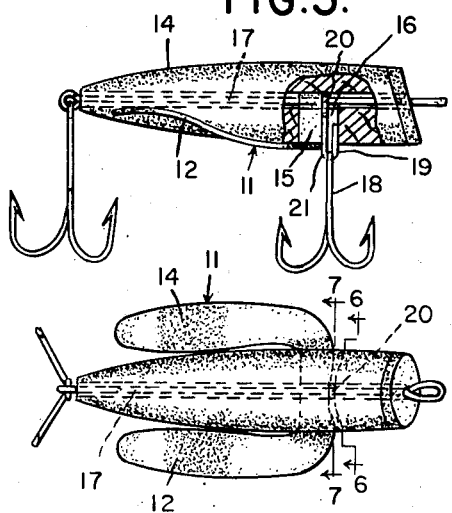
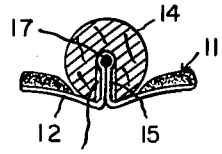
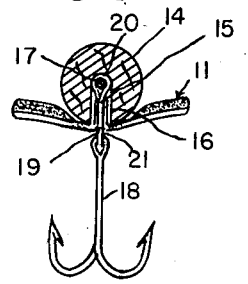
*INVENTOR.*
AUGUST W. NIKANDER
BY
ATTORNEYS Patented Apr. 4, 1950

2,502,879

UNITED STATES PATENT OFFICE 2,502,879

ARTIFICIAL BAIT

August W. Nikander, Highland Park, Mich.

Application June 9, 1947, Serial No. 753,502

3 Claims. (Cl. 43—42.08)

The invention relates to artificial fish baits and refers more particularly to baits of the plug type.

The invention has for some of its objects to provide a simple construction of artificial bait which may be economically manufactured; and to provide an artificial bait so constructed that its parts are effectively secured together.

With these and other objects in view the invention resides in the novel features of construction and combinations and arrangements of parts as more fully hereinafter set forth.

In the drawings:

Figure 1 is a top plan view of an artificial bait embodying the invention;

Figure 2 is a side elevation thereof;

Figure 3 is a cross-section on the line 3—3 of Figure 1;

Figure 4 is a view similar to Figure 1 showing a modified construction of artificial bait;

Figure 5 is a side elevation partly in section thereof;

Figures 6 and 7 are cross-sections on the lines 6—6 and 7—7 respectively of Figure 4.

The artificial fish bait shown in Figures 1, 2, and 3 is of the plug type having the continuous body 1, the wing member 2 and the hook 3 at the rear end of the body. The body is formed of a suitable material, such as wood, and as illustrated the body decreases in cross-sectional dimensions from its front end to its rear end and has its front end or nose bevelled to incline upwardly and rearwardly. The body is provided with the opening or bore 4 extending longitudinally therethrough and is also provided with the recess 5 extending from one side of the body, preferably the bottom, to and communicating with the opening or bore. The recess is preferably a slot extending longitudinally of the body throughout a relatively small portion of its length. The wing member 2 is preferably formed of metal and has the wings 6 at opposite sides of the body 1 and the integral intermediate return-bent portion 7 which extends within the recess 5 and the opening 4 and forms an eye in the opening.

To secure the wing member 2 and the hook 3 to the body 1 there is the rod member 8 extending through the opening 4 and also through the eye formed in the return-bent portion 7 of the wing member. This rod member is a wire provided with the eye 9 at the rear end of the body 1 for engaging the eye of the hook 3 and also provided with the eye 10 at the front end of the body 1 for attachment to the fishline.

In the modified construction of artificial bait illustrated in Figures 4, 5, 6 and 7, the wing member 11 has its wings 12 extending generally parallel to the longitudinal opening or bore extending through the body 14. This wing member is formed with the integral intermediate return-bent portion 15 which extends within the recess 16 and the opening 13 of the body and forms an eye through which the rod member 17 extends for securing the wing member to the body in the same manner as illustrated in Figures 1, 2 and 3. The bait has the additional hook 18 which is also secured to the body by the rod member 17, the recess 16 which is in the nature of a longitudinal slot being of a length to also receive the attaching means 19 between the rod member 17 and the hook 18. This attaching means, as illustrated, is a wire having the loop 20 which is an eye through which the rod member extends and the loop 21 for engaging the eye of the hook, the end of the latter loop extending upwardly within the recess so that the hook cannot become accidentally disengaged.

From the above description it will be readily seen that I have provided a simple construction of artificial bait in which the parts are effectively secured together.

What I claim as my invention is:

1. An artificial bait comprising a body having an opening extending longitudinally therethrough and a slot intermediate the ends and extending longitudinally of said body and from one side thereof to and communicating with the opening, a wing member having wings at opposite sides of said body and extending in opposite directions from said slot, said wing member also having a return bent portion intermediate said wings extending transversely of said wings and within the slot and opening and a wire extending through the opening and also through said return bent portion for securing said wing member to said body.

2. An artificial bait comprising a body having an opening extending longitudinally therethrough and a recess intermediate the ends and extending longitudinally of said body, said recess extending from one side of said body to and communicating with the opening, a wing member having wings at opposite sides of said body and extending in opposite directions from said recess, said wing member also having a portion intermediate said wings extending transversely of said wings and within the recess and opening and a wire extending through the opening and engaging said portion for securing said wing member to said body.

3. An artificial bait comprising a body having a bore extending longitudinally therethrough and a slot intermediate the ends of said body and extending longitudinally and from one side of said body to and communicating with the bore, a sheet metal wing member having wings at opposite sides of said body and extending in opposite directions from said slot, said wing member also having a portion intermediate said wings extending transversely of said wings and within the slot and bore, a hook, a member connected to said hook and extending within the slot and bore and a wire extending through the bore and also through said transverse portion and connected to said member, said wire having means at one end of said body for attachment to a line.

AUGUST W. NIKANDER.

REFERENCES CITED

The following references are of record in the file of this patent:

UNITED STATES PATENTS

| Number | Name | Date |
|---|---|---|
| 1,093,980 | Donaly | Apr. 21, 1914 |
| 1,188,583 | Townsend | June 27, 1916 |
| 1,207,588 | Maus | Dec. 5, 1916 |
| 1,772,250 | Hagen | Aug. 5, 1930 |